UNITED STATES PATENT OFFICE.

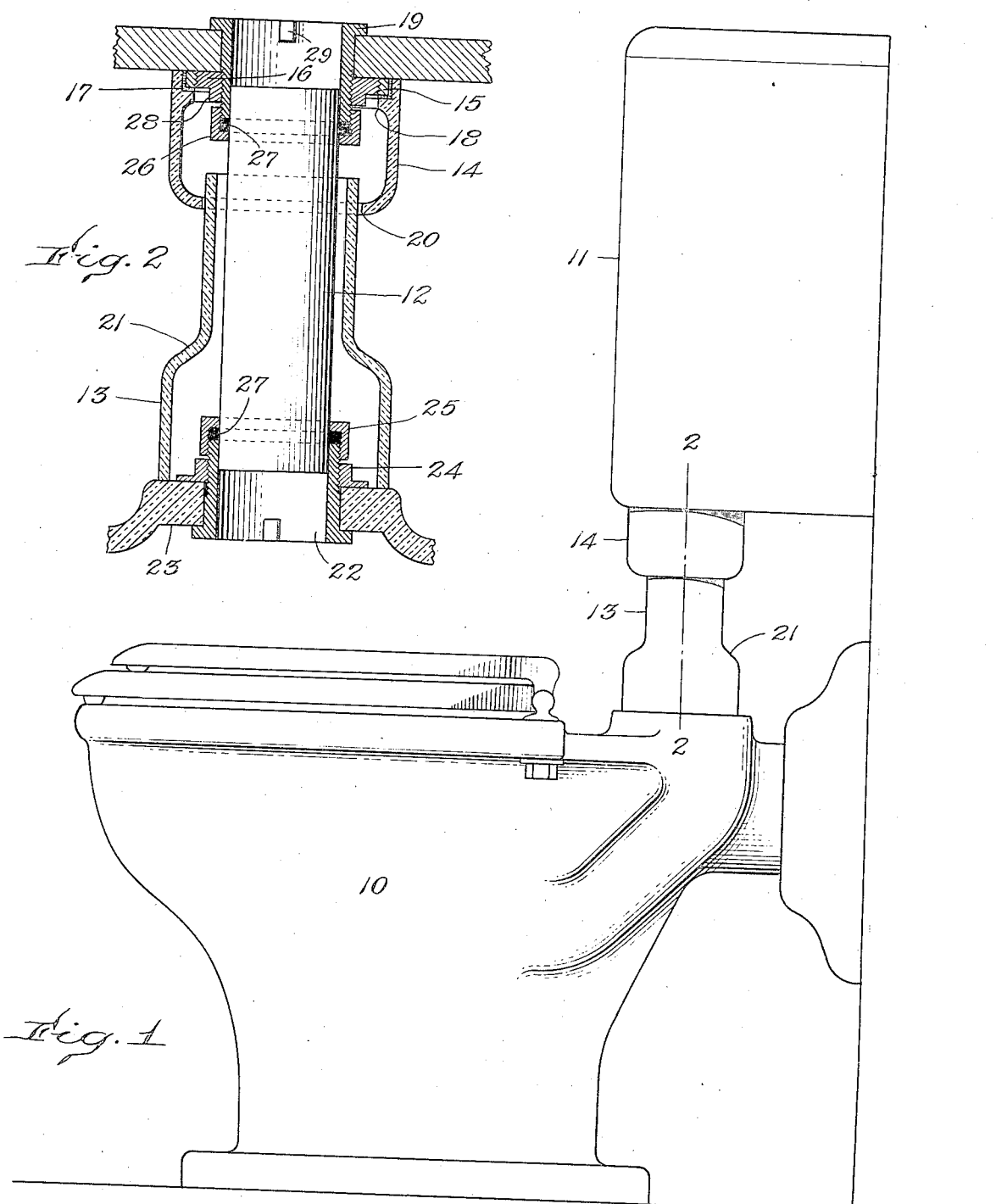

ALFRED ROGERS, OF MILTON, MASSACHUSETTS, ASSIGNOR TO THE DECECO COMPANY, OF BOSTON, MASSACHUSETTS, A CORPORATION OF RHODE ISLAND.

PIPE-CASING.

1,131,961.

Specification of Letters Patent.  Patented Mar. 16, 1915.

Application filed September 3, 1913. Serial No. 788,022.

*To all whom it may concern:*

Be it known that I, ALFRED ROGERS, a citizen of the United States, and resident of Milton, in the county of Norfolk and State of Massachusetts, have invented certain new and useful Improvements in Pipe-Casings, of which the following is a specification.

The object of the present invention is to provide a casing for pipes suitable for plumbing connections.

The invention is embodied in coöperative telescoping members which may be made of porcelain, or other material covered, if desired, with porcelain.

The accompanying drawings show the invention specially adapted for incasing a flushing pipe which connects a water-closet bowl and flushing tank therefor.

On the drawings,—Figure 1 represents a side elevation of a water-closet bowl and flushing tank, and includes a casing for the flushing pipe. Fig. 2 represents a vertical section, on a larger scale, through the structure intersected by line 2—2 of Fig. 1.

The same reference characters indicate the same parts wherever they occur.

A water-closet bowl is indicated at 10, and a flushing tank therefor is indicated at 11. A flushing pipe, indicated at 12, connects the flushing tank and bowl 10. The casing for the pipe 12 comprises telescoping members 13 and 14. These telescoping members may be composed of porcelain or metal, and if made of metal they may be covered with porcelain or enamel. The member 13 rests upon the bowl 10, and the member 14 is supported so that its upper end is against the tank 11. The lower end of the member 13 is of substantially the same diameter as the member 14, and the upper end of the member 13 is reduced and extends into the lower end of the member 14. The depth of the larger portion of the member 13 is substantially equal to the depth of the member 14, and the casing is therefore symmetrical in appearance.

The preferred form of means for supporting the member 14 comprises a metal ring 15, secured in the upper end of the member 14, and formed with an internal screw-thread for cooperating with an external screw-thread formed upon a nut 16. The ring 15, as shown, is secured to the member 14 by any suitable plaster or cement, indicated at 17, the member 14 being formed with an internal annular flange 18 for holding the cement. The nut 16 is provided primarily for securing a bushing 19 in the wall of the flushing tank, this bushing serving as a valve seat for the usual flush valve (not shown). The nut 16 therefore serves two purposes, namely, that of securing the valve-seat member 19 in the flushing tank and that of supporting the casing member 14. An inwardly-turned flange 20 at the lower end of the member 14 coacts with the upper end of the member 13 to center the member 13; but the members 13 and 14 are always free to move longitudinally with relation to each other. The fittings shown at the lower end of the pipe 12 are for the most part duplicates of those at the upper end. The bushing 22 is clamped against the annular flange 23 of the bowl 10 by a nut 24. Packing nuts 25 and 26 have threaded engagement respectively with the bushings 22 and 19, and contain packing rings 27. The member 13 may be lifted in order to apply a wrench to the nut 24.

The pipe casing is preferably placed over the flushing pipe 12, after the closet bowl 10 has been installed, but before the tank 11 has been installed. When the closet bowl has been set in position and the pipe 12 connected thereto, the member 13 is slipped over the pipe, and the member 14 is then placed over the upper end of the member 13, so that it rests upon the shoulder 21. The tank 11 may then be set up and the pipe 12 connected thereto. The last operation will then be screwing the member 14 upon the member 16.

The casing consisting of the members 13 and 14, protects the pipe 12 and its fittings from corroding elements, and dispenses with the necessity of plating or polishing the pipe and fittings, because the latter are entirely concealed.

I claim:

1. The combination with a closet bowl and flushing tank, a pipe connecting said bowl and tank, means upon the exterior of said tank for coupling said pipe to said tank, and means upon the exterior of said bowl for coupling said pipe to said bowl; of a pipe casing comprising telescoping members inclosing both of said coupling means and said pipe and abutting respectively against said bowl and tank.

2. The combination with a closet bowl and flushing tank, a pipe connecting said bowl and tank, and means upon the exterior of said bowl for coupling said pipe to said bowl; of a pipe casing comprising telescoping members one of which is arranged to inclose said coupling means and abut against said bowl, and means arranged to hold the other of said telescoping members in abutting relation to said tank, said means being inclosed by said other member.

3. The combination with a closet bowl and flushing tank, a pipe connecting said bowl and tank, and means upon the exterior of said tank for coupling said pipe to said tank; of a pipe casing comprising telescoping members one of which is adapted to inclose said coupling means, and means carried by said coupling means and arranged to coact with the interior of said one of said telescoping members to support said one in abutting relation to said tank.

4. The combination with a closet bowl and flushing tank and a pipe connecting said bowl and tank; of a pipe casing comprising telescoping members of porcelain arranged to inclose said pipe and abut respectively against said bowl and tank.

5. The combination with a closet bowl and flushing tank, a pipe connecting said bowl and tank, and coupling means for making a tight joint between said pipe and tank; of a pipe casing comprising telescoping members one of which is adapted to inclose said coupling means and abut against said tank, said coupling means and the interior of said inclosing member having coactive means for detachably holding said member.

6. The combination with a closet bowl, flushing tank, and flushing pipe connecting said bowl and tank, of a pipe casing comprising telescoping members one of which abuts against said bowl and the other of which abuts against said tank, and means arranged to hold said other member against the tank as stated, said means being inclosed by said other member.

In testimony whereof 1 have affixed my signature, in presence of two witnesses.

ALFRED ROGERS.

Witnesses:
WALTER P. ABELL,
P. W. PEZZETTI.

Copies of this patent may be obtained for five cents each, by addressing the "Commissioner of Patents, Washington, D. C."